(12) United States Patent
Bouly et al.

(10) Patent No.: US 6,852,666 B1
(45) Date of Patent: Feb. 8, 2005

(54) PURIFYING COMPOSITION WITH $NO_x$ TREATMENT AND INTERNAL COMBUSTION ENGINE EXHAUST GASES

(75) Inventors: Christophe Bouly, Valentigney (FR); Thierry Pontier, La Rochelle (FR); Christian Sarda, Dasle (FR); Christian Bert, Epinay-sur-Orge (FR); Marc Guyon, Arpajon (FR); Najat Moral, Saint-Michel-sur-Orge (FR); Thierry Birchem, Paris (FR); Catherine Hedouin, Gouvieux (FR); Thierry Seguelong, Puteaux (FR)

(73) Assignees: Faurecia Systemes d'Echappement, Boulogne (FR); Rhodia Chimie, Boulogne Billancourt (FR); Renault, Boulogne Billancourt (FR)

( * ) Notice: Subject to any disclaimer, the term of this patent is extended or adjusted under 35 U.S.C. 154(b) by 0 days.

(21) Appl. No.: 09/959,785

(22) PCT Filed: May 4, 2000

(86) PCT No.: PCT/FR00/01208

§ 371 (c)(1),
(2), (4) Date: Mar. 4, 2002

(87) PCT Pub. No.: WO00/67883

PCT Pub. Date: Nov. 16, 2000

(30) Foreign Application Priority Data

May 7, 1999 (FR) .............................................. 99 05869

(51) Int. Cl.[7] .......................... B01J 23/34; B01J 23/02; B01J 23/04; B01J 23/10; B01J 23/38
(52) U.S. Cl. ...................... 502/304; 502/302; 502/303; 502/324; 502/340; 502/344; 502/325; 502/328; 502/330; 502/349
(58) Field of Search ................................. 502/324, 340, 502/344, 302, 325, 328, 330, 303, 304, 349

(56) References Cited

U.S. PATENT DOCUMENTS

| | | | |
|---|---|---|---|
| 5,057,482 A | * | 10/1991 | Fukuda et al. .............. 502/303 |
| 5,750,082 A | * | 5/1998 | Hepburn et al. ......... 423/213.5 |
| 5,906,958 A | * | 5/1999 | Park et al. ................... 502/324 |
| 6,228,799 B1 | * | 5/2001 | Aubert et al. ............... 502/304 |
| 6,358,880 B1 | * | 3/2002 | Hedouin et al. ............. 502/302 |
| 6,475,452 B1 | * | 11/2002 | Hedouin et al. ......... 423/213.2 |
| 6,491,886 B1 | * | 12/2002 | Hedouin et al. ......... 423/239.1 |
| 6,548,032 B1 | * | 4/2003 | Barthe et al. ............. 423/213.2 |
| 2002/0048542 A1 | * | 4/2002 | Deeba et al. ............. 423/239.1 |

FOREIGN PATENT DOCUMENTS

| | | | |
|---|---|---|---|
| DE | 44 03 367 | * | 8/1994 |
| DE | 44 03 367 | | 3/1997 |
| DE | 197 24 545 | * | 12/1998 |
| EP | 0 513 413 | * | 11/1992 |
| EP | 0 613 714 | * | 9/1994 |
| EP | 0 764 460 | * | 3/1997 |
| FR | 2738756 | * | 3/1997 |
| FR | 2 738 756 | | 3/1997 |
| JP | 9-75741 | * | 3/1997 |
| JP | 9-253496 | * | 9/1997 |
| JP | 11-114424 | * | 4/1999 |
| JP | 11-114424 | | 7/1999 |
| KR | 97-20188 | * | 5/1997 |
| WO | WO 97/10892 | * | 3/1997 |
| WO | WO 97/43214 | * | 11/1997 |
| WO | WO 98/16472 | * | 4/1998 |
| WO | WO 99/01216 | * | 1/1999 |

OTHER PUBLICATIONS

Translation of KR 97–20188, May, 1997.*

* cited by examiner

Primary Examiner—Christina Ildebrando
(74) Attorney, Agent, or Firm—Young & Thompson

(57) ABSTRACT

A composition for purifying exhaust gases of an internal combustion engine capable of consuming fuel with lean air-fuel ratios includes elements adsorbing the $NO_x$ present in the exhaust gases, in the presence of excess oxygen and releasing the adsorbed $NO_x$ when the oxygen concentration of the exhaust gases decreases. The $NO_x$ adsorbing element includes in combination: a first composition comprising a support and an active phase, the active phase being based on manganese and at least another element A selected among, alkalines and alkaline-earths, the manganese and element A being chemically bound; a second composition including a support and an active phase based on manganese and at least another element B selected among alkalines, alkaline-earths and rare earths, the second composition having or being capable of having a specific surface area of at least 80 $m^2/g$ after being calcined at 800° C., and furthermore, a reducing and/or three-way catalyst function is incorporated in the $NO_x$ adsorbing element.

14 Claims, No Drawings

PURIFYING COMPOSITION WITH $NO_x$ TREATMENT AND INTERNAL COMBUSTION ENGINE EXHAUST GASES

The present invention relates to compositions for the treatment of exhaust gases of internal combustion engines.

In motor vehicle exhaust systems, catalysts are used to convert the carbon monoxide, the hydrocarbons and the nitrogen oxides $NO_x$ produced using the operation of the engine into more environmentally friendly gases.

When the engine operates with a stoichiometric or slightly rich air/fuel ratio, that is to say between about 14.7 and 14.4, catalysts containing palladium, platinum and rhodium, or mixtures or alloys of these metals, are capable of effectively converting, simultaneously, the three families of gases.

Such catalysts are often called three-way catalysts.

However, to allow fuel savings to be made, it is desirable to operate the engines under lean burn conditions in which the air/fuel ratio is greater than 14.7 and generally between 19 and 27.

Three-way catalysts are capable of converting carbon monoxide and hydrocarbons but are not effective for reducing $NO_x$ produced during lean burn operation.

This is because conventional three-way catalysts require very strict proportions between the oxidizing agents and the reducing agents and therefore cannot treat, by catalytic conversion, the $NO_x$ from the exhaust gases when these have an excess of oxygen.

To solve this problem, exhaust gas purification devices containing $NO_x$ traps have been developed. The principle of these devices, especially that described in patent EP-560 991, is to absorb the $NO_x$ produced using operation of the engine with a lean mixture.

This $NO_x$ absorption is obtained by making the stream of exhaust gases discharged from the combustion chambers pass through a monolith impregnated with absorptive substances. These substances are mainly formed from alkali or alkaline-earth elements and from oxidation catalysts. Nitrogen oxides $NO_x$, preoxidized into $NO_2$ by suitable catalysts such as platinum, are absorbed on the surface of the alkali or alkaline-earth elements by the formation of nitrates.

Storage capacity and lifetime are necessarily limited, which means that regenerations, usually called purges, have to be carried out periodically. They have two objectives, namely to release the $NO_x$ thus trapped and to reduce the nitrogen oxides into nonpolluting compounds (nitrogen).

This purging step is executed thanks to a tailored engine strategy making it possible to generate an environment having a low oxygen content and containing large amounts of reducing agents (CO, $H_2$ or HC). $NO_x$ reduction is then provided by the addition to the monolith of a reducing function, often based on platinum or rhodium.

It is known that certain alkali materials such as barium, potassium or strontium, in combination with platinum, are capable of storing or absorbing nitrogen oxides under excess oxygen conditions.

These $NO_x$ traps are particularly beneficial because of their ability to remove $NO_x$ from the exhaust gases of engines operating with lean burn.

Such exhaust gas purification systems, although they are clearly able to achieve efficiencies compatible with the levels needed to meet the legislative standards, by tailored operation of the alternations between the absorption phases and the so-called regeneration phases, do have a number of drawbacks.

It has become apparent that the $NO_x$ traps known at the present time have a number of drawbacks. They require high levels of precious metals since these precious metals participate both in the $NO_x$ storage reactions and in $NO_x$ reduction. They are therefore very expensive to manufacture.

Moreover, current $NO_x$ traps are very sensitive to poisoning by sulfur (coming from the sulfur initially present in the fuel). This is because sulfur oxides are substituted, because of the presence of the oxidation catalyst, by a process very similar to that responsible for the formation of nitrates, for the $NO_x$ oxides on the surface of the alkali and alkaline-earth elements. The trapping activity therefore gradually decreases over time and it is necessary to develop sulfur purge strategies, strategies which consume high levels of reducing agents and in particular of fuels.

$NO_x$ traps have therefore been developed which comprise a porous support and catalysts comprising manganese and potassium.

The porous support may be made of alumina, a cerium oxide, a zirconium oxide or a zeolite.

It has already been envisioned to combine an $NO_x$ trap of the type described above with a three-way catalyst placed in an exhaust line upstream of the $NO_x$ trap.

In such an arrangement, the three-way catalyst, being mounted close to the engine, rapidly heats up and ensures effective conversion of the cold-start emissions.

Next, when the engine is hot, the three-way catalyst removes the hydrocarbons, carbon monoxide and nitrogen oxides from the exhaust gases during stoichiometric operation and the hydrocarbons and carbon monoxide during operation with lean burn.

The $NO_x$ trap placed downstream of the three-way catalyst comes into play when the temperature of the exhaust gases allows it to reach maximum efficiency.

It has also been envisaged to place a three-way catalyst downstream of the $NO_x$ trap.

The fact of placing an $NO_x$ trap and a three-way catalyst upstream and/or downstream of the latter in an exhaust line requires, for these compounds, separate packaging to be included in an exhaust line, which increases the overall size of the system and consequently its manufacturing cost.

The invention aims to create a composition for the treatment of the exhaust gases of an internal combustion engine which, while having a greater efficiency than the known compositions, has a lower manufacturing cost, in particular with regard to its packaging in order to incorporate it into an exhaust line of a motor vehicle.

The subject of the invention is therefore a composition for purifying the exhaust gases of an internal combustion engine able to carry out the combustion of a fuel with lean air/fuel ratios comprising means which absorb the $NO_x$ present in the exhaust gases, in the presence of excess oxygen, and which release the absorbed $NO_x$ when the oxygen concentration of the exhaust gases decreases, characterized in that the means absorbing the $NO_x$ comprise a combination of:

a first composition comprising a support and an active phase, the active phase being based on manganese and on at least one other element A selected from the alkali metals and alkaline-earth metals, the manganese and the element A being chemically bonded to each other, a second composition comprising a support and an active phase based on manganese and on at least one other element B selected from the alkali metals, alkaline-earth metals and rare earths, this second composition having, or being capable of having, a specific surface area of at least 80 $m^2/g$ after undergoing calcination for 8 hours at 800° C., and in that, furthermore, a reduction and/or three-way-catalyst function is incorporated into the means absorbing the $NO_x$.

According to other features of the invention:

the reduction and/or three-way-catalyst function is incorporated into the compositions absorbing the $NO_x$ in the same catalytic formulation;

the reduction and/or three-way-catalyst function is incorporated into the compositions absorbing the $NO_x$ in different catalytic formulations deposited on the same substrate.

The invention will be more clearly understood on reading the description which follows.

Further features, details and advantages of the invention will become more fully apparent upon reading the description which follows.

For the entire description, the term "rare earths" is understood to mean the elements of the group consisting of yttrium and the elements of, the Periodic Table having an atomic number lying between 57 and 71 inclusive.

Moreover, the expression "specific surface area" is understood to mean the BET specific surface area determined by nitrogen adsorption in accordance with the ASTM D 3663-78 standard established from the Brunauer-Emmett-Teller method described in the journal "*The Journal of the American Chemical Society*", 60, 309 (1938).

The means absorbing the $NO_x$ for an engine operating with lean burn are characterized by the combination of two specific compositions which will now be described in greater detail.

These compositions comprise a support and an active phase. The term "support" must be taken in a broad sense in order to denote, within the composition, the majority element(s) and/or elements either without any catalytic activity or specific trapping activity, or having a catalytic or trapping activity not equivalent to that of the active phase, and on which support(s) the other elements are deposited. To simplify matters, reference will be made in the rest of the description to support and to active or supported phase, but it will be understood that it would not be outside the scope of the present invention if an element described as belonging to the active or supported phase were to be present in the support, for example by having been introduced therein during the actual preparation of the support.

The first composition is described below.

This composition comprises an active phase which is based on manganese and on at least one other element A selected from the alkali metals and alkaline-earth metals. As alkali element, mention may most particularly be made of sodium and potassium. As alkaline-earth element, mention may especially be made of barium. Since the composition may include one or more elements A, any reference in the rest of the description to the element A must therefore be understood as also being applicable to the case in which there are several elements A.

Moreover, the manganese and A elements are present in this first composition in a chemically bound form. By this is meant that there are chemical bonds between the manganese and the element A resulting from a reaction between them, these two elements not being simply juxtaposed as in a simple mixture. Thus, the manganese is and A elements may be present in the form of a compound or in the form of a phase of mixed-oxide type.

This compound or this phase may especially be represented by the formula $AxMnyO2~(1)$ in which $0.5<y/x<6$. As phase or compound of formula (1) mention may be made by way of example of those of the vernadite, hollandite, romanechite or psilomelane, birnessite, todorokite, buserite or lithiophorite type. Optionally, the compound may be hydrated. The compound may moreover have a lamellar structure of the $CdI_2$ type. The formula (1) is given here by way of illustration—it would not be outside the scope of the present invention if the compound were to have a different formula provided, of course, that the manganese and the element A are indeed chemically bound together.

Electron microscopy or X-ray analysis makes it possible to reveal the presence of such a compound.

The oxidation state of the manganese may vary between 2 and 7, and more particularly between 3 and 7.

In the case of potassium, this element and manganese may both be present in the form of a K2Mn4Og type compound. In the case of barium, it may be a compound of the $BaMnO_3$ type.

The first composition furthermore includes a support. As support, any porous support that can be used in the field of catalysis may be employed. It is preferable for this support to exhibit chemical inertness with respect to manganese and the element A sufficient to prevent any substantial reaction of one or of these elements with the support which might be liable to obstruct the creation of a chemical bond between the a manganese and the element A.

However, in the case of a reaction between the support and these elements, it is possible to employ larger amounts of manganese and of the element A in order to mi obtain the desired chemical bond between these elements.

More particularly, the support is based on an oxide chosen from cerium oxide, zirconium oxide or mixtures ru thereof.

In the case of mixtures of cerium oxide and zirconium oxide, mention may especially be made of those described in patent applications EP-A-605 274 and EP-A-735 984, the teaching of which is incorporated here. More particularly, it is possible to use supports based on cerium oxide and on zirconium oxide, in which supports these oxides are present in a cerium/zirconium atomic ratio of at least 1.

For these same supports, it is also possible to use those in the form of a solid solution. In this case, the X-ray diffraction spectra of the support reveal, within the latter, the existence of a single homogeneous phase. For supports richer in cerium, this phase in fact corresponds to that of a crystallized cubic ceric oxide $CeO_2$, the cell parameters of which are shifted to a greater or lesser extent with respect to a pure ceric oxide, thus reflecting the incorporation of zirconium into the crystalline lattice of cerium oxide, and therefore the formation of a true solid solution.

In the case of cerium oxide and zirconium oxide mixtures, mention may also be made of based on these two oxides and also on scandium oxide or an oxide of a rare earth other than cerium, and especially those described in patent application WO 97/43214, the teaching of which is incorporated here. In particular, this application describes compositions based on a cerium oxide, a zirconium oxide and an yttrium oxide, or else, other than cerium oxide and zirconium oxide, one based on at least one other oxide chosen from scandium oxide and oxides of rare earths with the exception of cerium, in a cerium/zirconium atomic ratio of at least 1.

These compositions have a specific surface area after being calcined for 6 hours at 900° C. of at least 35 $m^2/g$ and an oxygen storage capacity at 400°C. of at least 1.5 ml d,o2lg.

According to one particular embodiment of the invention, the support is based on cerium oxide and it furthermore includes silica. Supports of this type are described in patent applications EP-A-207 857 and EP-A-547 924, the teaching of which is incorporated here.

The total content of manganese, alkali metal and alkaline-earth metal may vary within wide proportions. The minimum content is that below which $NO_x$ adsorption activity is no longer observed. This content may especially be between 2 and 50%, more particularly between 5 and 30%, this value being expressed in at % with respect to the sum of moles of oxide(s) of the support and of the elements involved in the active phase.

The respective manganese, alkali and alkaline-earth metal contents may also vary over wide proportions, the manganese content may especially be equal to or close to that of the alkali metal or alkaline-earth metal content.

The first composition of the compound of the invention may be prepared by a process in which the support is brought into contact with manganese and at least one other element A or with precursors of manganese and of at least one other element A and in which the whole system is calcined at a temperature sufficient to create a chemical bond between the manganese and the element A.

One method that can be used for the above contacting is impregnation. Thus, a solution or slip of salts or of compounds of the elements of the supported phase is firstly formed.

As salts, the salts of inorganic acids, such as nitrates, sulfates or chlorides, may be selected.

It is also possible to use the salts of organic acids and especially salts of saturated aliphatic carboxylic acids or salts of hydroxycarboxylic acids. As examples, mention may be made of formates, acetates, propionates, oxalates, or citrates.

Next, the support is impregnated with the solution or slip.

Dry impregnation is more particularly used. Dry impregnation consists in adding, to the product to be impregnated, a volume of an aqueous solution of the element which is equal to the pore volume of the solid to be impregnated.

It may be advantageous to deposit the elements of the active phase in two steps. Thus, it may be advantageous to deposit the manganese in a first step and then the element A in a second step.

After impregnation, the support is optionally dried and then calcined. It should be noted that it is possible to use a support which has not yet been calcined prior to impregnation.

The active phase may also be deposited by spray-drying a suspension based on salts or compounds of the elements of the active phase and of the support. The spray-dried product thus obtained is then calcined.

The calcination takes place, as indicated above, at a temperature sufficient to create a chemical bond between the manganese and the element A.

This temperature varies depending on the nature of the element A but in the case of calcination in air it is generally at least 600° C., more particularly at least 700° C. and may especially be between 800° C. and 850° C.

Higher temperatures are not generally necessary insofar as the chemical bond between manganese and the element A has already formed, but they may, however, result in a reduction in the specific surface area of the support, which is liable to reduce the catalytic properties of the composition.

The calcination time depends especially on the temperature and is also set so as to be sufficient to create a chemical bond of the elements.

The second composition of the compound of the invention will now be described.

This composition also includes a support and an active phase.

That mentioned above with regard to the active phase of the first composition also applies here, especially with regard to the nature of the elements of this phase and their amount. Thus, the element B may be more particularly sodium, potassium or barium.

The active phase of the second composition may also be based on manganese and on at least one rare earth. This rare earth may more particularly be selected from cerium, terbium, gadolinium, samarium, neodymium and praseodymium.

The total content of manganese, alkali metal, alkaline-earth metal or rare earth may vary between 1 and 50%, more particularly between 5 and 30%. This content is expressed in at % with respect to the sum of the moles of oxide(s) of the support and of the elements involved in the supported phase. The respective manganese, alkali metal, alkaline-earth metal or rare-earth contents may also vary within wide proportions; the manganese content may especially be equal to or similar to that of the element B.

As indicated above, one feature of the second composition is that it has, or is capable of having, a specific surface area of at least 80 $m^2/g$ after calcination for 8 hours at 800° C. More particularly, this specific surface area is at least 100 $m^2/g$ after calcination for 8 hours at 800°.

The expression "specific surface area" is understood to mean the BET specific surface area determined by nitrogen adsorption in accordance with the ASTM D 3663-78 standard established from the Brunauer-Emmett-Teller method described in the journal "*The Journal of the American Chemical Society*", 60, 309 (1938).

This surface area feature is obtained by selecting a suitable support, especially one having a sufficiently high specific surface area.

This support may be based on alumina. Here, any type of alumina capable of having a specific surface area sufficient for application in catalysis may be used. Mention may be made of the aluminas resulting from the rapid dehydration of at least one aluminum hydroxide, such as bayerite, hydrargillite or gibbsite, nordstrandite, e/or of at least one aluminum oxyhydroxide such as boehmite, pseudoboehmite and diaspore.

According to one particular embodiment of the invention, a stabilized alumina is used. As stabilizing element, mention may be made of rare earths, barium, silicon and zirconium. As rare earths, mention may most particularly be made of cerium, lanthanum or the lanthanum-neodymium mixture.

The stabilized alumina is prepared in a manner known per se, especially by impregnating the alumina with solutions of salts, such as nitrates, of the aforementioned stabilizing elements, or else by co-drying an alumina precursor and salts of these elements, followed by calcination.

Mention may also be made of another way of preparing the stabilized alumina, in which the alumina powder coming from the rapid dehydration of an alumina hydroxide or oxyhydroxide is subjected to a ripening operation in the presence of a stabilizing agent consisting of a lanthanum compound and, optionally, a neodymium compound, this compound possibly being more particularly a salt.

The ripening operation may be carried out by putting alumina in suspension in water and then heating it to a temperature of, for example, between 70 and 110° C. After ripening, the alumina is subjected to a heat treatment.

Another preparation consists of a similar type of treatment, but with barium.

The stabilizer content expressed as the weight of stabilizer oxide with respect to the stabilized alumina, is generally between 1.5 and 15%, more particularly between 2.5 and 11%.

The support may also be based on silica.

It may also be based on silica and on titanium oxide in a Ti/(Ti+Si) atomic ratio of between 0.1 and 15%. This ratio may more particularly be between 0.1 and 10%. Such a support is described, for example in patent application WO 99/01216, the teaching of which is incorporated here.

As another suitable support, those based on cerium oxide and zirconium oxide may be used, these oxides possibly being in the form of a mixed oxide or of a solid solution of zirconium oxide in cerium oxide, or vice versa. These supports are obtained by a first type of process which comprises a step in which a mixture comprising zirconium oxide and cerium oxide is formed and the mixture thus formed is washed or impregnated with an alkoxylated compound having a number of carbon atoms greater than 2. The impregnated mixture is then calcined.

The alkoxylated compound may be selected especially from products of formula (2): R1-((CH2)xO)n-R2, in which R1 and R2 represent linear or nonlinear alkyl groups, or H or OH or Cl or Br or I; n is an integer between 1 and 100; and x is an integer between 1 and 4, or else those of formula (3): (R3, R4)-φ-((CH2)xO)n-OH, in which φ denotes a benzene ring, R3 and R4 are identical or different substituants of this ring and represent hydrogen or linear or nonlinear alkyl groups having from 1 to 20 carbon atoms, x and n being defined as above; or else those of formula (4): R4—O—((CH$_2$)xO)$_n$—H where R4 represents a linear or nonlinear alcohol group having from 1 to 20 carbon atoms; x and n being defined as above; or those of formula (5): R5—S—((CH$_2$)$_x$O)$_n$—H, where R5 represents a linear or nonlinear alkyl group having from 1 to 20 carbon atoms, x and n being defined as above.

In the case of these products, reference may be made to patent application WO 98/16472, the teaching of which is incorporated here.

These supports may also be obtained by a second type of process which comprises a step in which a solution of a cerium salt, a solution of a zirconium salt and an additive selected from anionic surfactants, nonionic surfactants, polyethylene glycols, carboxylic acids and their salts are made to react, optionally the reaction being able to take place in the presence of a base e/or an oxidizing agent.

As anionic surfactants, carboxylates, phosphates, sulfates and sulfonates may more particularly be used. Among the nonionic surfactants, ethoxylated alkyl phenols and ethoxylated amines may preferably be used.

The reaction between the zirconium and cerium salts may take place by heating the solution containing the salts
   this is then a thermal hydrolysis reaction. It may also take
      place by precipitation, by introducing a base into the-
      solution containing the salts.

In the case of these products, reference may be made to patent application WO 98/45212, the teaching of which is incorporated here.

The second composition may be prepared using the same methods as thosegiven above in the case of the first composition. It should be noted that, after the support has been brought into contact with the elements of the active phase, the whole system is calcined at a temperature sufficient for these elements to be present in the form of oxides. In general, this temperature is at least 500° C., more particularly at least 600° C.

The compound of the invention as described above is in the form of a powder but it may optionally be formed so as to be in the form of granules, beads, cylinders or honeycombs of varying dimensions.

The invention also relates to a system that can be used for trapping $NO_x$, which comprises a coating (washcoat) having catalytic properties and incorporating the compound according to the invention, this coating being deposited on a substrate, for example, of the ceramic or metallic monolith type.

This system may be in the form of various embodiments.

According to a first embodiment, the system comprises a substrate and a coating consisting of two superposed layers. In this case, the first layer contains the first composition of the compound and the second layer contains the second composition.

The layers may be in any order, that is to say the internal layer in contact with the substrate may contain either the first or the second composition, the outer layer deposited on the first then containing the other composition of the compound.

According to a second embodiment, the compound is present in the coating in the form of a single layer which contains, in this case, the two aforementioned compositions in the form of a mixture obtained for example by mechanical mixing.

A third embodiment may be envisioned. In this case, the system comprises two juxtaposed substrates, each substrate comprising a coating.

The coating of the first substrate contains the first composition and the coating of the second substrate contains the second composition.

The invention also relates to the use of a compound as described above in the manufacture of such a system.

The reduction and/or three-way-catalyst (TWC) function is composed in the following manner.

Precious metals: Group VIII of the Periodic Table: Pt, Pd and Rh with the following contents:
   Pt: from 0.03 to 4 g/l, preferably between 0.3 and 1.9 g/l;
   Pd: from 0.03 to 5.6 g/l, preferably between 0.3 and 4 g/l;
   Rh: from 0.03 to 1.2 g/l, preferably between 0.07 and 0.6 g/l.

The reduction and/or three-way-catalyst (TWC) function is optimized by the following combinations on the same catalyst: Pt/Rh, Pd/Rh and Pt/Pd/Rh.

The precious metals may be deposited on the monolith already coated with the support or "washcoat", together, or in succession, and preferably in certain layers if multilayer technology is used.

In the latter case, at least one support layer or washcoat may support none of the aforementioned precious metals, the other layers possibly supporting between one and three of them with different contents and proportions.

They may also be deposited before the support is coated on at least one of the powders.

The same support may be impregnated with several previous metals, either separately (for example the first metal is impregnated over a fraction of the support and the second metal over the remaining fraction of the same support) or together or successively over the same part of the support.

Supports: They are of two types:

Among the refractory oxides known to those skilled in the art for this type of application, it is preferred to use alumina at between 20 and 250 g/l and preferably between 50 and 150 g/l.

It is preferred to use gamma-alumina, but alpha-, delta-, eta-, kappa- and theta-alumina may also be present on the support with a specific surface area of 1 to 300 m$^2$/g and preferably between 10 and 200 m$^2$/g.

This alumina may be thermally stabilized by adding one or more dopants such the oxides of alkaline-earth metals, preferably Ba and Sr, or the oxides of rare earths, preferably La and Ce.

The total content of these dopants is between 1 and 15% and preferably between 3 and 10% by weight.

Oxygen storage components

The content of these components is between 10 and 200 g/l, preferably between 20 and 100 g/l, of preformed cerium or Ce—Zr oxides which can be doped. These oxides may contain between 10 and 90% by weight of Ce oxide and from 10 to 90% of Zr oxide and between 1 and 20% of dopants. The possible dopants are preferably oxides of rare earths, preferably La, Pr, Nd and yttrium. Several dopants or promoters may be present in the same Ce—Zr oxide.

Several Ce—Zr oxides of different compositions may be used in the same technology and, in the case of a multilayer technology, each layer may contain several of said Ce—Zr oxides, of different compositions, both within the same layer and between the various layers.

Moreover, at least one of the layers may contain none of this type of compound.

$H_2S$-fixing elements:

The reduction and/or three-way-catalyst function contains 0 to 50 g/l at most, preferably between 10 and 30 g/l, of such fixing elements.

The oxides preferred for this function are the oxides of Ni, Cu and Mn and may be used by themselves or in combination, as they are or deposited on one or more of the aforementioned supports, but also on the cerium oxide.

These compounds may be coated in a specific layer not containing precious metals.

The reduction and/or three-way-catalyst (TWC) function, as described above, may be deposited in the form of a monolayer or in the form of a multilayer on a substrate.

The $NO_x$ trap product as described above may be deposited in the form of a monolayer or in the form of a multilayer on this same substrate, or else combined with the reduction and/or three-way-catalyst (TWC) function and then deposited.

A sandwich-type combination of these two functions is also conceivable. It may be achieved by deposition of each of these functions on separate supports and assembly of said supports by superposition.

The three-way-catalyst product may also be added to each of the two $NO_x$ trap compositions, which have each been deposited on a different substrate, it being possible for said substrates to be juxtaposed.

The two, $NO_x$ trap and reduction and/or three-way-catalyst, functions as described above are deposited on the same parallel-channeled substrate, preferably a cordierite substrate, in the following proportions:

$NO_x$ trap: from 25 to 500 g/l and preferably between 100 and 300 g/l;

reduction and/or three-way catalyst: from 25 to 300 g/l and preferably from 50 to 150 g/l;

i.e. a total charge of 50 to 800 g/l.

The invention also relates to a process for treating gases for the purpose of reducing the emissions of nitrogen oxides using the compound of the invention.

The gases that can be treated within the context of the present invention are, for example, those emanating from gas turbines, from boilers of thermal power stations or else from internal combustion engines. In the latter case, these may especially be diesel engines or engines operating with a lean mixture.

The compound of the invention operates as $NO_x$ traps when it is brought into contact with gases having a high oxygen content. The expression "gases having a high oxygen content" is understood to mean gases having an excess amount of oxygen with respect to the amount needed for stoichiometric combustion of the fuels and, more specifically, gases having an excess amount of oxygen with respect to the stoichiometric value $\lambda=1$, i.e. gases for which the k value is greater than 1.

The $\lambda$ value is correlated to the air-fuel ratio in a manner known per se, especially known in the field of internal combustion engines. Such gases may be those from an engine operating with a lean mixture (lean burn) and having an oxygen content (expressed by volume) of, for example, at least 2%, together with those having an even higher oxygen content, for example gases from engines of the diesel type, i.e. at least 5% or more than 5%, more particularly at least 10%, this content possibly being, for example, between 5% and 20%.

EXAMPLES

Examples of preparation of a formulation exhibiting $NO_x$ trap and reduction and/or three-way-catalyst (TWC) properties will be described below.

Example 1

The $NO_x$ trap function was formed by a (K-Mn)-based composition supported on a (Ce—Zr-La)-based composition and by a (K-Mn)-based composition supported on an $Al_2O_3$-Ce-based composition, the whole thing being referred to hereinafter as $NO_x$ trap and coated on a parallel-channeled substrate of the cordierite type with a charge of 20 g/l.

The three-way-catalyst (TWC) function was formed in the following manner:

deposition of 0.56% of Rh on a Ce—Zr oxide support having a solid structure with 20% cerium and 80% zirconium and mixed: 25 g/l charge;

deposition of 0.56% of Pd on a support made of $Al_2O_3$ stabilized by a Ba dopant: 125 g/l charge.

The formulation according to the invention therefore had a total composition of 350 g/l of active phase on a cordierite ceramic substrate, split between 200 g/l of the $NO_x$ trap function and 150 g/l of the reduction and/or three-way-catalyst (TWC) function.

The formulation thus described was coated in the form of a monolayer on said cordierite substrate with a 350 g/l charge of active phase.

The catalyst thus obtained was aged at 875° C. for 6 h in a redox composition (CO, 02 and $H_2$0).

The results of the evaluation obtained from the catalytic tests are given below:

Catalytic tests of the three-way-catalyst (TWC) functions

Light-off temperature tests

The composition of the gas on which the light-off temperature test was carried out is given in Table I.

TABLE I

Composition of the gas tested.
Test carried out by a thermal sweep between 200 and 450° C.

| | | Richness | |
| Component | Unit | 0.9600 | 1.0200 |
| --- | --- | --- | --- |
| $CO_2$ | % | 14 | 14 |
| $H_2O$ | % | 10 | 10 |
| CO | % | 0.4 | 1.4 |
| $O_2$ | % | 0.775 | 0.484 |
| $C_3H_6$ | ppm | 375 | 375 |
| $C_3H_8$ | ppm | 125 | 125 |
| NO | ppm | 950 | 950 |
| $N_2$ | % | 74.68 | 73.97 |

HSV (hourly space velocity) =70 000 h$^{-1}$. Results of light-off tests:

|  | $T_{light-off}$ (R = 1.02) | | |
|---|---|---|---|
|  | CO | HC | NO$_x$ |
| NO$_x$ trap alone | n(*) | n(*) | n(*) |
| TWC only 310° C. | 310° C. | 304° C. | 331° C. |
| Invention | 294° C. | 299° C. | 294° C. | n(*): not measurable.

Richness test

The composition of the gas on which the richness test was carried out is given in Table II:

TABLE II

Composition of the gas tested.
Test carried out at a temperature of 465° C.
Richness varying between 1.04 and 0.97.

| Component | Unit | Contents |
|---|---|---|
| CO$_2$ | % | 14 |
| H$_2$O | % | 10 |
| CO | % | 1.4 |
| O$_2$ | % | 0.085 to 1.46 |
| C$_3$H$_6$ | ppm | 375 |
| C$_3$H$_8$ | ppm | 125 |
| NO | ppm | 950 |
| N$_2$ | % | 74.37 to 72.995 |

HSV =70 000 h$^{-1}$.
Frequency perturbation: 0.5 hertz.
Amplitud ±3%.

|  | % conversion to the isoconversion point | | |
|---|---|---|---|
|  | CO | HC | NO$_x$ |
| NO$_x$ trap alone | n(*) | n(*) | n(*) |
| TWC alone | 97.6 | 99.1 | 97.6 |
| Invention | 99.8 | 99.7 | 99.8 | n(*): not measurable.

Catalytic tests of the NO$_x$ trap functions:
Experimental conditions: HSV=70 000 h$^{-1}$, 10% H$_2$O, 500 ppm NO, 10% O$_2$, 10% CO$_2$.
Results

|  | Trapped NO$_x$ in mg/liter of catalyst in 30 s | | | |
|---|---|---|---|---|
|  | 300° C. | 350° C. | 400° C. | 450° C. |
| NO$_x$ trap alone | 45 | 70 | 68 | 31 |
| TWC alone | n(*) | 9 | 56 | 60 |
| Invention | 78 | 140 | 140 | 104 | n(*): not measurable.

The composition for the treatment of exhaust gases according to the invention has, compared with the known compositions, the following advantages.

The synergy of the various components of the composition allows:

better performance of the three-way-catalyst (PWC) function thanks to the optimization of the OSC components for the storage of oxygen, which components are contained in the NC) trap, such as CeO$_2$ of the example or any other product (Ce—Zr, etc.), and which widen the activity window in scan mode and the conversion to the isoconversion point IP;

better performance in terms of NO$_x$ storage capacity in grams per liter of catalyst and widening of the temperature window by the optimal use of the precious metals contained in the three-way-catalyst (TWC) function, favoring the conversion of NO into NO$_2$, preferably at low temperature.

Because of the increase in the performance, it is possible to significantly reduce the catalytic volume or the number of catalytic converters.

This provides better treatment of the NO$_x$ (reduction) desorbed by the NO$_x$ trap because of the proximity of the incorporated reduction function, which is deposited on the same substrate.

What is claimed is:

1. A composition for purifying the exhaust gases of an internal combustion engine that is able to carry out the combustion of a fuel with lean air/fuel ratios, comprising means which absorb NOR present in the exhaust gases, in the presence of excess oxygen, and which release the absorbed NO$_x$ when the oxygen concentration of the exhaust gases decreases, wherein the means absorbing the NO$_x$ are adapted to be deposited on a substrate and comprise a combination of:

a first composition comprising a support, the support for the first composition being based on an oxide chosen from cerium oxide, zirconium oxide or mixtures thereof, and an active phase, the active phase being based on manganese and on at least one other element A selected from alkali metals and alkaline-earth metals, the manganese and the element A being chemically bonded to each other, a second composition comprising a support based on alumina or alumina stabilized by silicon, zirconium, barium or a rare earth, or silica and an active phase based on manganese and on at least one other element B selected from the alkali metals, alkaline-earth metals and rare earths, this second composition having, or being capable of having, a specific surface area of at least 80 m$^2$/g after calcination for 8 hours at 800° C., and in that, furthermore, a reduction and/or three-way-catalyst function is incorporated into the means absorbing the NO$_x$.

2. The composition according to claim 1, wherein the second composition has, or is capable of having, a specific surface area of at least 100 m2/g after calcination for 8 hours at 800° C.

3. The composition according to claim 1, wherein elements A and B are chosen from potassium, sodium and barium.

4. The composition according to claim 1, wherein the support for the second composition is based on silica and further contains titanium oxide in a Ti/Ti+Si atomic ratio of between 0.1 and 15%.

5. The composition according to claim 1, wherein the support for the first composition is based on cerium oxide and it further comprises silica.

6. The composition according to claim 1, wherein the reduction and/or three-way-catalyst function is incorporated into the composition absorbing the NO$_x$ in the same catalytic formulation.

7. The composition according to claim 1, wherein the reduction and/or three-way-catalyst function is incorporated into the composition absorbing the $NO_x$ in different catalytic formulations deposited on the same substrate.

8. The composition according to claim 1, wherein the reduction and/or three-way-catalyst function comprises, on the same catalyst:
- one or more precious metals selected from the group consisting of Pt, Pd, and Rh; and
- at least one material selected from the group consisting of supports; refractory oxides, which may or may not be doped with alkaline-earth elements, or preformed with Ce—Zr oxides which can be doped with rare-earth and/or yttrium oxides; and $H_2S$-fixing elements selected from Ni, Mn, Cu oxides or elements.

9. The composition according to claim 1, wherein the reduction and/or three-way-catalyst function is deposited in the form of monolayer or in the form of a multilayer on a substrate, whereas the $NO_x$ trap product is deposited in the form of a monolayer or in the form of a multilayer on this same substrate, or else combined with the reduction and/or three-way-catalyst function and then deposited on said substrate.

10. The composition according to claim 1, wherein the reduction and/or three-way-catalyst function and the $NO_x$ k trap product form a sandwich-type combination by deposition on separate supports and assembly of said supports by superposition.

11. The composition according to claim 1, wherein the reduction and/or three-way-catalyst function and each of the $NO_x$ trap compositions form a combination.

12. The composition according to claim 11, wherein said combination is deposited on the same substrate.

13. The composition according to claim 1, wherein the reduction and/or three-way-catalyst function and the $NO_x$ trap compositions are deposited on a separate substrate, the two substrates then being juxtaposed.

14. An exhaust gas purification device comprising:
- a substrate; and
- a composition according to claim 1 deposited on said substrate.

* * * * *